United States Patent
Tuomaala

[15] 3,676,909
[45] July 18, 1972

[54] ROLLER

[72] Inventor: Jorma A. K. Tuomaala, Karhula, Finland

[73] Assignee: A. Ahlstrom Osakeyhtio, Noormarkku, Finland

[22] Filed: June 1, 1970

[21] Appl. No.: 42,237

[30] Foreign Application Priority Data

June 4, 1969 Finland..................................1669/69

[52] U.S. Cl.....................29/110, 29/116 AD, 29/113 AD
[51] Int. Cl.........................................................B21b 27/00
[58] Field of Search............29/110, 113 R, 113 AD, 116 AD, 29/129.5, 116 R; 100/162 B

[56] References Cited

UNITED STATES PATENTS

| | | | |
|---|---|---|---|
| 1,868,860 | 7/1932 | Von Reis | 29/116 R UX |
| 41,851 | 3/1864 | Merritt | 29/129.5 |
| 1,546,408 | 7/1925 | Rushton | 29/129.5 |
| 3,424,651 | 1/1969 | De Noyer et al. | 29/113 R |
| R26,219 | 6/1967 | Kusters et al. | 29/116 AD |
| 2,648,122 | 8/1953 | Hornbostel | 29/113 AD |
| 3,389,450 | 6/1968 | Robertson | 29/116 AD |
| 3,430,319 | 3/1969 | Skaugen | 29/116 AD |
| 2,854,700 | 10/1958 | Caspari et al. | 100/162 B UX |

FOREIGN PATENTS OR APPLICATIONS

| | | | |
|---|---|---|---|
| 893,426 | 4/1962 | Great Britain | 29/113 AD |

*Primary Examiner*—Alfred R. Guest
*Attorney*—Albert M. Parker

[57] ABSTRACT

Inside a tubelike mantle a shaft is attached at the middle of the mantle and the shaft has roller bearings at both ends for rotating the mantle on a support or stand. The mantle is furthermore supported at one or several points between the point at which the shaft is attached to the mantle and the end of the mantle by supporting means mounted either inside the mantle on the shaft or outside the mantle on the support, stand, base or the like.

1 Claim, 9 Drawing Figures

Patented July 18, 1972　　　3,676,909

ROLLER

BACKGROUND OF THE INVENTION

1. Field of the Invention

The invention relates to the field of rollers designed to squeeze various webs of material, e.g. to remove water or smooth out the surface in the manufacture of paper, textiles or the like.

2. Prior Art

Deflection of the rollers appears in a pair of rollers forming the compression space when the rollers are loaded in order to obtain compression. Owing to the deflection the compression load (linear load) is different at different points of the roller. However, in the manufacture of paper an even linear load is of great importance, and therefore attempts have been made to compensate for the deflection of the rollers with different methods and structures.

One of these solutions is the cambered roller, which gives satisfactory results only with a pre-determined compression load. The so-called anti-deflection rollers, in which the deflection of the rollers can be varied according to the required compression load, are known as such, for example from the U.S. Pat. specification No. 3,131,625. These are, however, very complex and expensive structures.

SUMMARY OF THE INVENTION

According to the invention there is created a roller with a very insignificant deflection so that it well meets the requirements for precision in the manufacture of paper, plastic and textile, but is structurally considerably simpler than the rollers introduced in the patents mentioned above.

The roller consists of a tubelike mantle, which is attached to the shaft inside it with supports at the middle of the roller and at two points close to the ends of the roller tube. The supporting forces effective at the ends of the roller tube can be adjusted so that the compression load is approximately even over the entire length of the roller.

Such a roller is previously known, U.S. Pat. No. 3,230,604, as consists of a tubelike mantle attached to the shaft inside it with supports at its middle.

Its deflection is smaller than that of a normal squeezing roller, but still to great in practice.

The improvement comprises supporting the mantle at one or several points between the point at which the shaft is attached to the mantle and the end of the mantle. The supporting means are mounted either on the shaft inside the mantle or outside the mantle or a base or the like.

DESCRIPTION OF THE PREFERRED EMBODIMENTS

Figure 1:
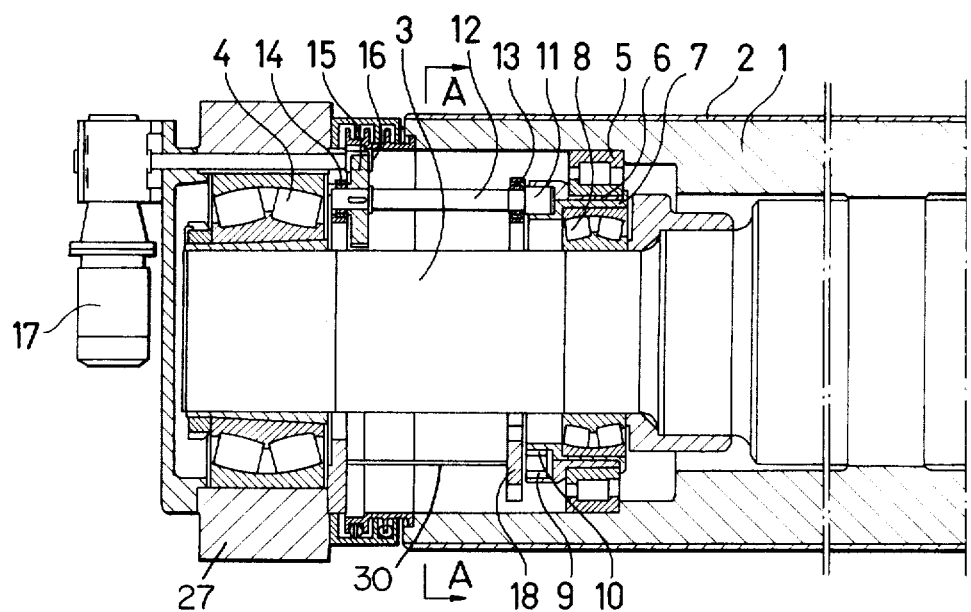
FIG. 1 shows a longitudinal section of the structure of the roller.
Figure 3:
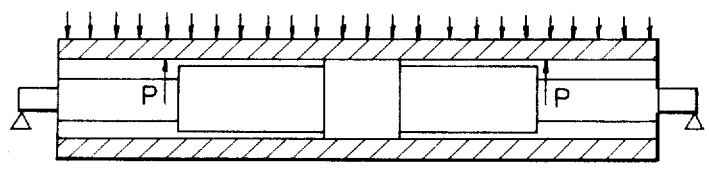
FIG. 3 schematically a new solution according to the invention.
Figure 4:
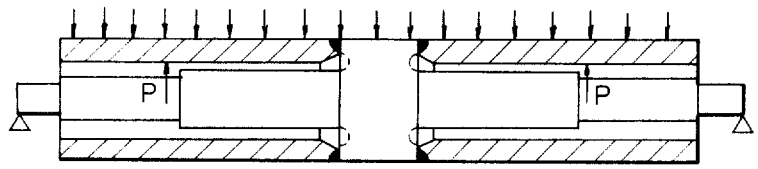
FIG. 4 shows an alternate structure of the shaft.

FIG. 1 shows a tubelike roller mantle 1, which can be covered with a layer of another material 2. Inside it is a shaft 3, which is fastened with bearings to bearings 4 at both ends. The roller tube 1 is attached at its middle to the shaft 3 with a contraction seam as shown in FIGS. 1 and 3, or with a welding seam as in FIG. 4. Close to the end of the roller, inside the roller tube, is a bearing 5, inside which are two eccentric rings 6 and 7 one inside the other, and inside them a bearing 8 on the shaft 3. Ring 6 has cogs inside 9 and ring 7 cogs outside 10, which are connected to each other with a toothed wheel 11. The eccentric rings 6 and 7 one inside the other have the same eccentricity $e$ see FIG. 8 so that the resulting eccentricity can be adjusted between the extremes 0 and $2e$.

The toothed wheel 11 is fastened with bearings to a stationary supporting ring 18 and it thus holds the rings 6 and 7 stationary when the roller is rotating.

Figure 2:
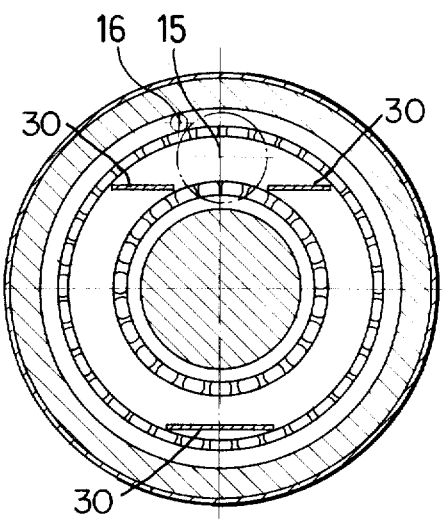
FIG. 2 its cross section along the line A—A.

As shown in FIGS. 1 and 2, the stationary ring 18 is fixed to a stationary axle box 27 by means of rods 30, and therefore the ring 18 does not rotate.

Through a shaft 12, which is fastened with bearings to bearings 13 and 14, and with the toothed wheels 15, 16, the toothed wheel 11 is attached to the motor or driving device 17. By turning the toothed wheel 11 the rings can be caused to turn mutually, at which time the resulting eccentricity of the rings will change and respectively also the distance between the centers of the roller tube and the shaft and thus indirectly the supporting force at this point.

Figure 5:
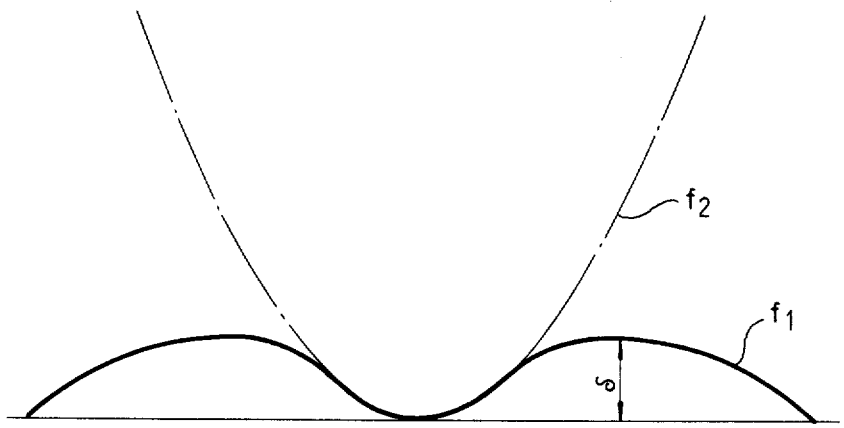
FIG. 5 shows the deflection line of a roller supported at the middle.
Figure 6:
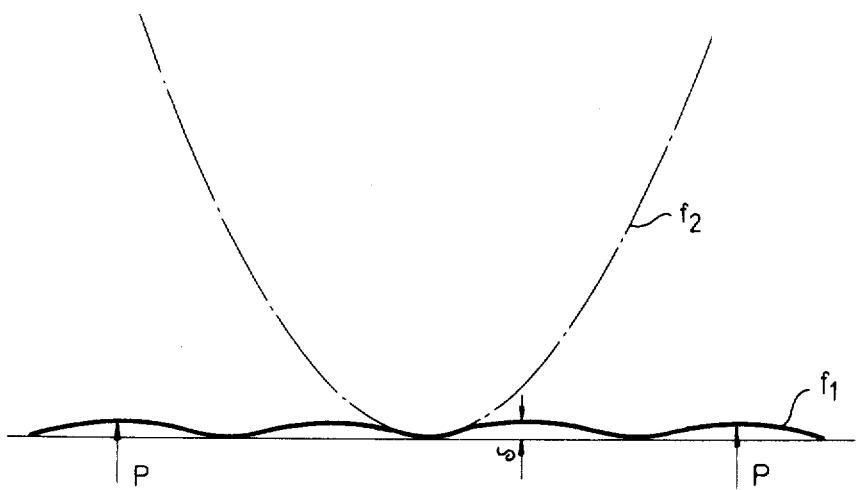
FIG. 6 the deflection line of a roller supported both at the middle and at its two ends.

FIG. 5 shows the deflection line of a roller supported at the middle; line $f_1$ indicates the deflection line of the roller tube and $f_2$ the deflection line of the shaft inside it. If the supporting force P is effective at both ends of the roller (FIG. 6), the deflection is smaller than in the former case. By choosing the place of the supporting point and the size of the supporting force (the distance between the centers of the roller tube and the shaft) in the most profitable manner, the result obtained is a deflection line that is practically straight (FIG. 6).

Figure 7:
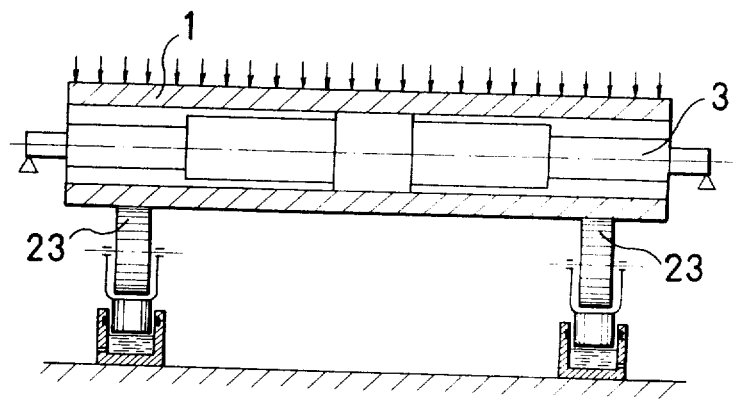
FIG. 7 shows schematically another structure of the invention, in which the supporting point is on the outer surface of the roller.

FIG. 7 shows schematically a structure in which the roller tube 1 is supported, between the bearing point of the shaft 3 and the point at which the shaft is fastened to the roller tube, with rotating rollers 23 that can be elevated and lowered hydraulically and that are propped against the roller tube.

Figure 8:
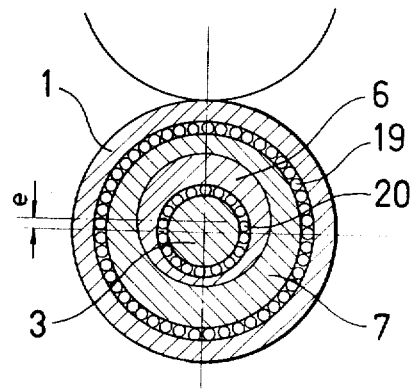
FIG. 8 shows in more detail the fitting of the eccentric rings.
Figure 9:
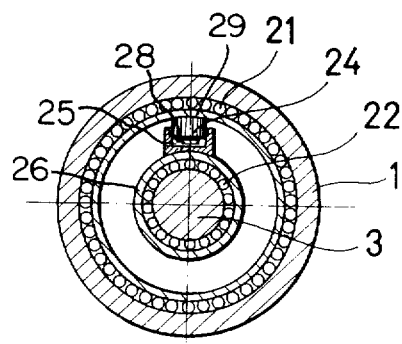
FIG. 9 shows a variation of a hydraulic support in which the supporting point is situated on the inner surface of the circumference of the roller.

In FIGS. 8 and 9 the numbers 19, 20, 21, and 22 indicate bearings.

FIG. 9 shows schematically a cross section of the hydraulic support arrangement 24 of the roller tube; the supporting points are placed at one or several locations on the inner surface of the roller tube between the bearing point of the shaft 3 and the point at which the shaft is fastened to the roller.

There is a hydraulic load means comprising a cylinder 25 supported on a ring 26 rotatably mounted around the axle 3 by means of a bearing 22. The cylinder 25 is attached to a stationary axle box in the manner discussed above with respect to figures 1 and 2. A pressure chamber 28 within the cylinder 25 is suitably connected to a source of pressure which can be appropriately regulated. The piston shown at 24, by moving in the cylinder, actuates a ring mounted with the bearing 21 in the roller 1 like the eccentric device shown in FIG. 1 and with similar effect. Such a piston arrangement is well known in the art, and those of ordinary skill in this art will realize the advantages of its use in the novel combination shown in FIG. 9.

Example:

Roller, the length of which is 7,500 mm, diameter of the roller tube 800/500 mm, load 100 kp/cm.

1. Roller tube is supported at the middle. Deflection $\delta$ 0.13 mm (FIG. 5).

2. Roller tube supported at the middle and at points 800 mm from the ends of the roller.

Deflection $\delta$ 0.01 mm (FIG. 6).

It has been verified in practice that optimal results are obtained if the distance of the supporting point from the ends of the roller and the width of the middle support is some 0.1 of the entire length of the roller.

What is claimed is:

1. Improved roller of the type having a tubelike mantle, a shaft inside the mantle and attached to the middle thereof, and roller bearings at both ends of the shaft for supporting the shaft, and including: hydraulic supporting means at at least one point between the point at which the shaft is attached to the mantle and the end of the mantle, said hydraulic supporting means being mounted inside the mantle on the shaft and including an hydraulic piston radially movable with respect to the shaft.

* * * * *